(12) United States Patent
Kitahata et al.

(10) Patent No.: US 7,709,427 B2
(45) Date of Patent: May 4, 2010

(54) LUBRICANT COMPOSITION, SPEED REDUCTION GEAR USING THE SAME, AND ELECTRIC POWER STEERING APPARATUS USING THE SAME

(75) Inventors: Kouji Kitahata, Osaka (JP); Naoki Uchida, Osaka (JP); Mitsuo Yoneda, Osaka (JP); Masahiro Hayashi, Yokohama (JP)

(73) Assignees: Koyo Seiko Co., Ltd., Osaka (JP); Nippon Polyurethane Industry Co., Ltd., Tokyo (JP)

( * ) Notice: Subject to any disclaimer, the term of this patent is extended or adjusted under 35 U.S.C. 154(b) by 1448 days.

(21) Appl. No.: 11/081,876

(22) Filed: Mar. 17, 2005

(65) Prior Publication Data
US 2005/0205341 A1    Sep. 22, 2005

(30) Foreign Application Priority Data
Mar. 18, 2004    (JP)    ............... 2004-078995

(51) Int. Cl.
*C10M 149/20*    (2006.01)
(52) U.S. Cl. .................. 508/528; 508/446; 508/447; 508/448; 508/513
(58) Field of Classification Search .......... 508/446, 508/447, 448, 462, 464, 476, 500, 506, 516, 508/528, 559, 562
See application file for complete search history.

(56) References Cited

U.S. PATENT DOCUMENTS

| | | | |
|---|---|---|---|
| 3,917,741 A | 11/1975 | McGarr | |
| 4,032,516 A | 6/1977 | McGarr | |
| 4,235,730 A * | 11/1980 | Schlicht | ............. 508/464 |
| 5,278,275 A * | 1/1994 | Yatsuka et al. | ........... 528/74 |
| 6,485,184 B1 | 11/2002 | Adachi et al. | |
| 2002/0123594 A1 * | 9/2002 | Hoffmann et al. | ........ 528/44 |
| 2003/0113285 A1 | 6/2003 | Meffert et al. | |
| 2006/0058201 A1 * | 3/2006 | Kitahata et al. | ........... 508/464 |

FOREIGN PATENT DOCUMENTS

| | | |
|---|---|---|
| DE | 101 21 284 A1 | 10/2002 |
| JP | 49-52295 | 5/1974 |
| JP | 54-139610 | 10/1979 |
| JP | 02-038453 | 2/1990 |
| JP | 6-73149 | 3/1994 |
| JP | 6-172770 | 6/1994 |
| JP | 7-268376 | 10/1995 |
| JP | 11-286601 | 10/1999 |
| JP | 2000-319681 | 11/2000 |
| JP | 2001-99170 | 4/2001 |
| JP | 2001-181668 | 7/2001 |
| JP | 2003-26995 | 1/2003 |
| JP | 2003-63424 | 3/2003 |
| JP | 2003-214529 | 7/2003 |
| JP | 2003-532768 | 11/2003 |
| JP | 2004-162018 | 6/2004 |
| JP | 2004-360729 | 12/2004 |
| WO | WO 2004/029184 A1 | 4/2004 |

OTHER PUBLICATIONS

An English-language Abstract of the Japanese patent publication No. 11-286601 (Oct. 19, 1999).
An English-language Abstract of the Japanese patent publication No. 2001-181668 (Jul. 3, 2001).
An English-language Abstract of the Japanese patent publication No. 07-173483 (Jul. 11, 1995).
An English-language Abstract of the Japanese patent publication No. 04-266995 (Sep. 22, 1992).

* cited by examiner

*Primary Examiner*—Glenn A Caldarola
*Assistant Examiner*—Taiwo Oladapo
(74) *Attorney, Agent, or Firm*—Rabin & Berdo, PC

(57) ABSTRACT

Disclosed are a lubricant composition to which is added as buffer particles to a lubricant polyurethane resin particles obtained by reacting and synthesizing long-chain polyol having a number-average molecular weight of not less than 500, a crosslinking agent having three or more active hydrogen groups in one molecule, and polyisocyanate as buffer particles, a speed reduction gear filled with the lubricant composition, and an electric power steering apparatus having the speed reduction gear incorporated therein, wherein noise produced by the speed reduction gear can be made lower than ever before irrespective of the magnitude of backlash in a case where a worm and a worm wheel are combined with each other and without complicating the configuration of the speed reduction gear by the buffer action of the buffer particles added to the lubricant composition, thereby making it possible to reduce noise produced in an automobile due to the electric power steering apparatus at low cost.

11 Claims, 4 Drawing Sheets

LUBRICANT COMPOSITION, SPEED REDUCTION GEAR USING THE SAME, AND ELECTRIC POWER STEERING APPARATUS USING THE SAME

BACKGROUND OF THE INVENTION

The present invention relates to a lubricant composition that can be suitably used for a speed reduction gear having a small gear such as a worm and a large gear such as a worm wheel, a speed reduction gear filled with the lubricant composition, and an electric power steering apparatus comprising the speed reduction gear.

Speed reduction gears are used for electric power steering apparatuses for automobiles. In a column type EPS (Electric Power Steering System), for example, the rotation of an electric motor is transmitted from a small gear such as a worm to a large gear such as a worm wheel in a speed reduction gear to reduce its speed as well as to amplify its output, and is then provided to a column, thereby torque-assisting a steering operation.

Suitable backlash is required to engage the small and large gears which serve as a speed reduction mechanism. At the time of forward/backward rotation of the gears and in a case where an automobile travels on a punishing road such as a stone pavement to cause input of a reaction force from a tire, for example, however, a teeth striking sound may, in some cases, be produced due to the backlash. When the teeth striking sound is transmitted as noise to the inside of the automobile, an uncomfortable feeling is given to a driver.

Therefore, so-called by-layer assembly for selecting a combination of the gears such that suitable backlash is obtained to assemble a speed reduction gear has been conventionally carried out. In such a method, however, the productivity is significantly low. Another problem is that even if the by-layer assembly is carried out, there occurs nonuniformity of a steering torque due to offcenter of a shaft of a worm wheel. The same problems exist in not only speed reduction gears in electric power steering apparatuses but also general speed reduction gears having the small and large gears.

In a speed reduction gear in an electric power steering apparatus, for example, therefore, it has been proposed that backlash is eliminated by providing urging means such as a spring member for making it possible for a worm shaft to be eccentric toward a worm wheel as well as urging the worm shaft in the direction of eccentricity (see Japanese Unexamined Patent Publication No. 2000-43739, for example).

However, the configuration of the above-mentioned speed reduction gear becomes significantly complicated, resulting in raised manufacturing cost.

SUMMARY OF THE INVENTION

An object of the present invention is to provide a lubricant composition capable of making noise produced by a speed reduction gear lower than ever before irrespective of the magnitude of backlash in a case where the small and large gears are combined with each other and without complicating the configuration of the speed reduction gear, a speed reduction gear which hardly produces noise by using the lubricant composition, and an electric power steering apparatus using the speed reduction gear.

The present invention is directed to a lubricant composition including a lubricant and buffer particles, characterized in that the buffer particles are polyurethane resin particles obtained by reacting and synthesizing (1) long-chain polyol having a number-average molecular weight Mn of not less than 500, (2) a crosslinking agent having three or more active hydrogen groups in one molecule, and (3) polyisocyanate.

According to the present invention, the polyurethane resin particles dispersed as the buffer particles in the lubricant composition are obtained by reacting and synthesizing the three components in the foregoing items (1) to (3). Therefore, the polyurethane resin particles have both suitable elasticity and hardness, and have the function of buffering collisions between gear teeth surfaces of the small and large gears with the particles interposed in an engaged portion of the gears to reduce a teeth striking sound, thereby making it possible to reduce noise produced by a speed reduction gear. It is also possible to prevent a steering torque produced by an electric power steering apparatus from excessively being raised and to prevent the noise produced by the speed reduction gear from being rather increased by production of a sliding sound. Moreover, the noise can be reduced at low cost without complicating the configuration of the speed reduction gear only by merely adding the polyurethane resin particles to the lubricant.

Preferable as the buffer particles are polyurethane resin particles obtained by reacting and synthesizing long-chain polyol, a crosslinking agent whose amount is 0.1 to 5 moles per 1 mole of the long-chain polyol, and polyisocyanate.

Preferable as the buffer particles are polyurethane resin particles obtained by reacting and synthesizing long-chain polyol obtained by mixing aliphatic polyester polyol A obtained by reacting and synthesizing an aliphatic carboxylic acid and low-molecular-weight polyol and aromatic polyester polyol B obtained by reacting and synthesizing an aromatic carboxylic acid and low-molecular-weight polyol at a weight ratio of A/B=5/95~95/5, a crosslinking agent, and polyisocyanate.

The polyurethane resin particles satisfying any of the foregoing conditions have both more suitable elasticity and hardness. Therefore, the noise produced by the speed reduction gear is further reduced, and excessive rise in the steering torque produced by the electric power steering apparatus and production of the sliding sound can be more reliably prevented.

Preferable as the buffer particles are spherical polyurethane resin particles obtained by reacting and synthesizing long-chain polyol, a crosslinking agent, and polyisocyanate while dispersing them in a non-aqueous dispersion medium.

In a case where the polyurethane resin particles are spherical, the steering torque produced by the electric power steering apparatus can be more reliably prevented from being raised by improving the fluidity of the lubricant composition. According to the production method, polyurethane resin particles having a spherical shape and having a uniform particle diameter can be efficiently produced.

The lubricant may be semisolid grease, or may be liquid lubricating oil.

When the lubricant is grease, it is preferable in using the lubricant composition for the speed reduction gear that the consistency of the lubricant composition in a state where the buffer particles are added thereto is No. 2 to No. 000 in terms of an NLGI (National Lubricating Grease Institute) number.

When the lubricant is liquid lubricating oil, it is similarly preferable in using the lubricant composition for the speed reduction gear that the kinetic viscosity thereof is 5 to 200 mm$^2$/s (40° C.).

A speed reduction gear according to the present invention is characterized by comprising a small gear and a large gear, and in that an area including an engaged portion of both the gears is filled with the above-mentioned lubricant composition, and is preferable in that noise such as a teeth striking sound caused by backlash can be reduced.

Furthermore, an electric power steering apparatus according to the present invention is characterized in that an output of a motor for steering assist is transmitted to a steering mechanism by reducing its speed through the above-mentioned speed reduction gear, and is preferable in that noise produced in an automobile can be reduced at low cost.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
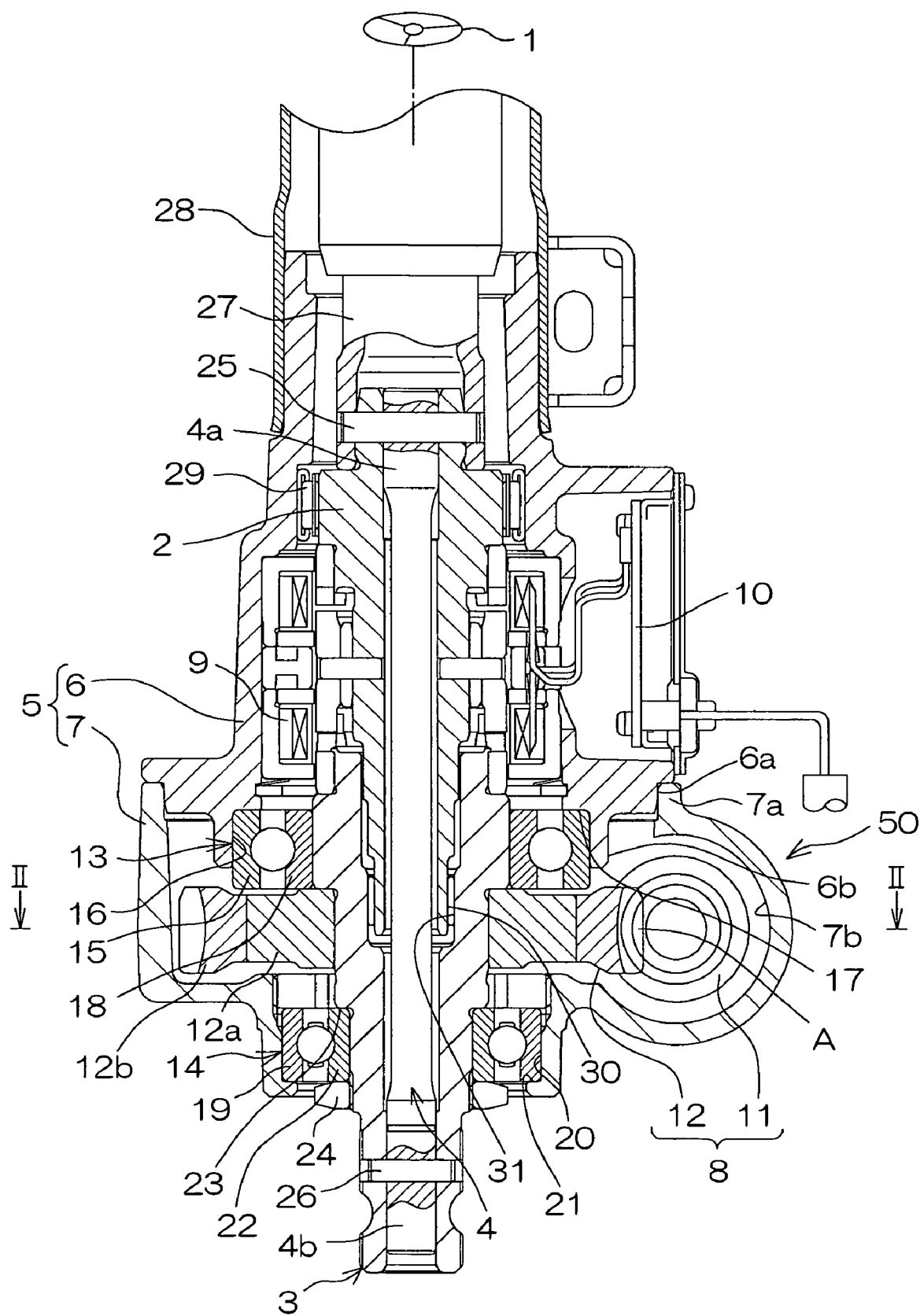
FIG. 1 is a schematic sectional view showing an electric power steering apparatus according to an embodiment of the present invention.

The present invention will be described in detail below.

<Lubricant Composition>

A lubricant composition according to the present invention comprises a lubricant and buffer particles, as described above.

As the buffer particles, polyurethane resin particles obtained by reacting and synthesizing is used:

(1) long-chain polyol having a number-average molecular weight Mn of not less than 500, (2) a crosslinking agent having three or more active hydrogen groups in one molecule, and (3) polyisocyanate.

Usable as the long-chain polyol in the item (1) are various types of polyols having a number-average molecular weight of not less than 500 and having an average of not less than one active hydrogen group in one molecule. Examples of such long-chain polyol include polyester polyol, polyamide ester polyol, polycarbonate polyol, polyether polyol, polyether ester polyol, polyolefin polyol, and animal/plant-based polyol. Out of the polyols, polyester polyol is preferable.

Examples of the polyester polyol include one synthesized with low-molecular-weight polyol by reaction with an acid component.

Examples of the acid component include one type or two or more types of acid component, that is polycarboxylic acids having no cationic group in a molecule, e.g., phthalic acid, isophthalic acid, terephthalic acid, naphthalenedicarboxylic acid, tartaric acid, oxalic acid, malonic acid, glutaric acid, pimelic acid, suberic acid, glutaconic acid, azelaic acid, sebacic acid, succinic acid, adipic acid, 1,4-cyclohexyl dicarboxylic acid, α-hydromuconic acid, β-hydromuconic acid, α-butyl-α-ethylglutaric acid, α,β-diethylsuccinic acid, maleic acid, fumaric acid, trimellitic acid, pyromellitic acid, etc.; polycarboxylic acids containing a sulfonic acid group, e.g., 5-sulfo-isophthalic acid; salts of polycarboxylic acids containing a sulfonic acid group and ammonia, organic amine, an alkali metal, an alkaline earth metal, etc.; anhydrides of polycarboxylic acids or polycarboxylic acids containing a sulfonic acid group, an acid halide, dialkyl ester, etc.

Examples of the low-molecular-weight polyol include low-molecular-weight polyols having no cationic group in a molecule, e.g., ethylene glycol, 1,2-propanediol, 1,3-propanediol, 1,2-butanediol, 1,3-butanediol, 1,4-butanediol, 1,5-pentanediol, 1,6-hexanediol, 2-methyl-1,5-pentanediol, 3-methyl-1,5-pentanediol, neopentyl glycol, 1,8-octanediol, 1,9-nonanediol, decamethylene glycol, diethylene glycol, dipropylene glycol, 2,2-diethyl-1,3-propanediol, 2-n-butyl-2-ethyl-1,3-propanediol, 2,2,4-trimethyl-1,3-pentanediol, 2-ethyl-1,3-hexanediol, 2-n-hexadecan-1,2-ethylene glycol, 2-n-eicosane-1,2-ethylene glycol, 2-n-octacosane-1,2-ethylene glycol, cyclohexane-1,4-diol, cyclohexane-1,4-dimethanol, 3-hydroxy-2,2-dimethyl-propyl-3-hydroxy-2,2-dimethyl propionate, dimmer acid diol, bisphenol A, hydrogenated bisphenol A, an ethylene oxide or propylene oxide adduct of bisphenol A, an ethylene oxide or propylene oxide adduct of hydrogenated bisphenol A, trimethylolpropane, glycerin, hexanetriol, quadrol, pentaerythritol, sorbitol, etc.

Examples of the low-molecular-weight polyol also include low-molecular-weight polyols containing a —COOH group, e.g., 2,2-dimethylol propionic acid, 2,2-dimethylol butanoic acid; salts of the low-molecular-weight polyols containing a —COOH group and ammonia, organic amine, an alkaline metal, an alkaline earth metal, etc.; low-molecular-weight polyols containing a sulfonic acid group, e.g., 2-sulfo-1,3-propanediol, 2-sulfo-1,4-butanediol, etc.; salts of the low-molecular-weight polyols containing a sulfonic acid group and ammonia, organic amine, an alkali metal, an alkaline earth metal, etc.

Examples of the polyester polyol also include lactone-based polyester polyols obtained by subjecting cyclic ester (so-called lactone) monomers such as ε-caprolactone, alkyl-substituted ε-caprolactone, δ-valerolactone, alkyl-substituted δ-valerolactone to ring opening polymerization using the low-molecular-weight polyol as an initiator.

Examples of the polyamide ester polyol out of the other long-chain polyols other than the polyester polyol include ones obtained by synthesis using low-molecular-weight polyamine such as hexamethylene diamine or isophorone diamine or low-molecular-weight aminoalcohol such as monoethanolamine in place of a part of the low-molecular-weight polyol in the above-mentioned production of the polyester polyol. Examples of the polycarbonate polyol include ones synthesized with one or more types of the low-molecular-weight polyols by dealcoholization or dephenolization with ethylene carbonate, diethyl carbonate, or diphenyl carbonate.

Examples of the polyether polyol include ones obtained by subjecting one type or two or more types of epoxides such as alkylene oxide (ethylene oxide, propylene oxide, etc.) or cyclic ethers such as tetrahydrofuran to ring opening polymerization using as an initiator the above-mentioned low-molecular-weight polyol, low-molecular-weight polyamine, or low-molecular-weight aminoalcohol. Examples of the polyether ester polyol include copolyol obtained from the above-mentioned polyether polyol and polycarboxylic acids. Examples of the polyether ester polyol also include ones synthesized with the above-mentioned polyester or polycarbonate by reaction with the epoxide or cyclic ether.

Examples of the polyolefin polyol include polybutadiene having two or more hydroxyl groups, hydrogenated polybutadiene, polyisoprene, hydrogenated polyisoprene, and their chlorinated materials. Examples of the animal/plant-based polyols include caster oil-based polyol and silk fibroin. If an example is one having a number-average molecular weight of not less than 500 and having an average of not less than one active hydrogen group in one molecule, polyols other than the foregoing polyols, e.g., dimmer acid-based polyol, hydrogenated dimmer acid-based polyol, etc. can be also used.

The polyester polyol is preferable, as described above, as the long-chain polyol. It is particularly preferable that both aliphatic polyester polyol obtained by reacting and synthesizing an aliphatic carboxylic acid and low-molecular-weight polyol and aromatic polyester polyol obtained by reacting and synthesizing an aromatic carboxylic acid and low-molecular-weight polyol are used as the polyester polyol.

The aliphatic polyester polyol functions to enhance the flexibility of the polyurethane resin, while the aromatic polyester polyol functions to enhance the rigidity of the polyurethane resin. By using both the aliphatic polyester polyol and the aromatic polyester polyol, the polyurethane resin particles have both suitable elasticity and hardness, as described above. Therefore, by using such polyurethane resin, noise produced by a speed reduction gear is further reduced, and excessive rise in steering torque produced by an electric power steering apparatus and production of a sliding sound can be more reliably prevented.

It is preferable that both the aliphatic polyester polyol A and the aromatic polyester polyol B are used at a weight ratio A/B=5/95~95/5. When the aliphatic polyester polyol A is smaller than the range, the polyurethane resin particles are too hard. Therefore, the particles serve as a resistance in an engaged portion so that the steering torque produced by the electric power steering apparatus may be excessively raised and the sliding sound may be produced. On the other hand, when the aromatic polyester polyol B is smaller than the range, the polyurethane resin particles are too soft so that the effect of reducing the noise produced by the speed reduction gear may be lowered.

Considering that suitable elasticity and hardness are provided to the polyurethane resin particles to reduce the noise produced by the speed reduction gear and the excessive rise in the steering torque produced by the electric power steering apparatus and the production of the sliding sound are prevented, it is preferable that both the aliphatic polyester polyol A and the aromatic polyester polyol B are used in the above-mentioned range and particularly, a range of a weight ratio A/B=10/90~90/10.

The crosslinking agent in the item (2) is for introducing a three-dimensional mesh-shaped structure into polyurethane resin to provide suitable elasticity and hardness to the polyurethane resin particles. Examples of such a crosslinking agent include various types of compounds having three or more active hydrogen groups in one molecule and preferably having a number-average molecular weight of less than 500. Specific examples of the crosslinking agent include polyols such as glycerin, sorbitol, trimethylolpropane, trimethylolbutane, trimethylolethane, 1,2,6-hexanetriol, and pentaerythritol, and aminoalcohols such as triethanolamine, diethanolamine, and N,N,N',N'-tetra(hydroxypropyl) diamine. Particularly, the trimethylolpropane and the trimethylolbutane having all active hydrogen groups being primary hydroxyl groups are suitably used.

It is preferable that the crosslinking agent in the item (2) is used at a ratio of 0.1 to 5 moles to 1 mole of the long-chain polyol in the item (1). If the ratio of the crosslinking agent is less than this range, the three-dimensional mesh-shaped structure introduced into the polyurethane resin is too sparse, and the polyurethane resin particles are too soft. Therefore, the effect of reducing the noise produced by the speed reduction gear may not be obtained. On the other hand, when the ratio of the crosslinking agent exceeds this range, the three-dimensional mesh-shaped structure introduced into the polyurethane resin is too dense, and the polyurethane resin particles are too hard. Therefore, the particles serve as a resistance in an engaged portion so that the steering torque produced by the electric power steering apparatus may be excessively raised and the sliding sound may be produced.

Considering that suitable elasticity and hardness are provided to the polyurethane resin particles to reduce the noise produced by the speed reduction gear and the excessive rise in the steering torque produced by the electric power steering apparatus and the production of the sliding sound are prevented, it is preferable that the ratio of the crosslinking agent to 1 mole of the long-chain polyol is particularly 0.5 to 3 moles even in the above-mentioned range.

Usable as the polyisocyanate in the item (3) are various types of compounds having at least two isocyanate groups in one molecule. Specific examples of the polyisocyanate include aromatic diisocyanate such as tolylene diisocyanate, xylylene diisocyanate, and 4,4'-diphenylmethane diisocyanate; aliphatic diisocyanate such as 1,6-hexamethylene diisocyanate, and 1,12-dodecane diisocyanate; and alicyclic diisocyanate such as cyclohexane-1,4-diisocyanate, and isophorone diisocyanate.

Examples of the polyisocyanate also include a compound having an isocyanate group at its end that is synthesized with each of the foregoing compounds by reaction with a compound containing an active hydrogen group; modified isocyanate that is obtained by synthesis using carbodiimidation or isocyanuration; and a compound obtained by reacting and synthesizing a condensate of aniline and formaldehyde with hosgen. Further, polyisocyanate a part or the whole of which is stabilized by a suitable block agent having one active hydrogen in one molecule, e.g., methanol, n-butanol, benzyl alcohol, ε-caprolactone, methyl ethyl ketone oxime, phenol, and cresol.

The mixture ratio of the polyisocyanate may be set such that the equivalent of an isocyanate group is approximately equal to the total amount of the equivalent of an active hydrogen group of the long-chain polyol and an active hydrogen group of the crosslinking agent. Specifically, it is preferable that the mixture ratio of the polyisocyanate is set such that the equivalent of the isocyanate group is approximately 0.9 to 1.1 times the total amount of the equivalent of the active hydrogen groups of the long-chain polyol and the crosslinking agent.

Various types of additives can be also contained, as required, in the polyurethane resin particles. Examples of the additive include an antioxidant, a fire retardant, etc. for preventing the polyurethane resin from being degraded, magnetic powders for applying magnetism to the polyurethane resin particles, and a colorant for coloring the particles.

The particle diameter of the polyurethane resin particles is not particularly limited. However, it is preferable that the average particle diameter $D_1$ is 50 μm<$D_1$≦300 μm. When the average particle diameter $D_1$ is not more than 50 μm, the effect of buffering shock in engagement between a small gear and a large gear to reduce a teeth striking sound has a limitation, and the noise produced by the speed reduction gear may not be able to be significantly reduced. On the other hand, when the average particle diameter $D_1$ exceeds 300 μm, the steering torque produced by the electric power steering apparatus may be raised, and the sliding sound may be produced.

It is preferable that the average particle diameter of the polyurethane resin particles is particularly not less than 100 μm in the above-mentioned range, considering that the effect of reducing the teeth striking sound is further improved. Further, it is preferable that the average particle diameter is particularly not more than 200 μm in the above-mentioned range, considering that the rise in the steering torque and the production of the sliding sound are more reliably prevented.

The polyurethane resin particles can be produced by various types of methods. However, polyurethane resin particles maintaining a spherical shape dispersed in a dispersion medium and having a uniform particle diameter can be efficiently produced if a dispersion polymerization method for reacting long-chain polyol, a crosslinking agent, and polyisocyanate in a state where they are dispersed in a non-aqueous dispersion medium is used.

Usable as the dispersion medium are various types of non-aqueous organic solvents that do not dissolve at least the long-chain polyol and the polyurethane resin produced by the reaction. Specific examples thereof include aliphatic hydrocarbons such as n-hexane, isooctane, dodecane, and liquid paraffin, and alicyclic hydrocarbons such as cyclohexane. Particularly in consideration of heating at the time of reaction, for example, a dispersion medium having a boiling point of not less than 60° C. is preferable. Further, polar solvents such as toluene, butyl acetate, and methyl ethyl ketone may be also used with above non-aqueous organic solvents, as required, as the dispersion medium.

A catalyst for promoting urethanation may be added, as required, to a reaction system. Examples of the catalyst include di-n-butyltin dilaurate, stannous octoate, a tertiary amines (N-methyl morpholine, triethylamine, etc.), lead naphthenate, and lead octoate. It is preferable that the amount of addition of the catalyst is approximately 0.01 to 1 parts by weight to 100 parts by weight of the total amount of the long-chain polyol, the crosslinking agent, and the polyisocyanate.

Furthermore, a dispersion stabilizer for stably dispersing a component such as the long-chain polyol in the non-aqueous dispersion medium may be added to the reaction system. Usable as the dispersion stabilizer are any of various types of dispersion stabilizers (surface-active agents). Examples of the preferable dispersion stabilizer include a compound obtained by reacting and synthesizing 100 parts by weight of polyester polyol or polycarbonate polyol having an unsaturated bond in a molecule with 20 to 400 parts by weight of an ethylenic unsaturated monomer having a side chain composed of a hydrocarbon group having six or more carbon atoms. It is preferable that the content of the dispersion stabilizer is 1 to 30 parts by weight to 100 parts by weight of the total amount of the long-chain polyol, the crosslinking agent, and the polyisocyanate.

In order to carry out the dispersion polymerization method, various types of emulsifiers conventionally known, for example, can be used. Although the procedure for feeding each component can be suitably selected, the following procedure is preferable. That is, the long-chain polyol and the dispersion medium are fed into a reaction chamber of the emulsifier, the dispersion stabilizer is added thereto, followed by agitation, to disperse the long-chain polyol in a spherical shape in the dispersion medium, and the catalyst and the polyisocyanate are then added in this order. The crosslinking agent is added in the step where the chain length of the polyurethane resin reaches a predetermined value after the formation of the polyurethane resin by the reaction between the long-chain polyol and the polyisocyanate progresses, to crosslink the polyurethane resin, thereby producing the polyurethane resin particles. The chain length of the polyurethane resin is found by titrating the concentration of an isocyanate end group of the polyurethane resin sampled from the chamber.

In order to adjust the average particle diameter of the polyurethane resin particles in the above-mentioned range in the dispersion polymerization method, agitation conditions (agitation speed, temperature, etc.) may be adjusted, the type and the amount of the dispersion stabilizer may be selected, and the type and the amount of the dispersion medium may be selected, for example. In order to add the above-mentioned additive to the polyurethane resin particles produced by the dispersion polymerization method, the additive may be mixed with the long-chain polyol used for polymerization, for example.

It is preferable that the mixture ratio of the buffer particles is 20 to 300 parts by weight to 100 parts by weight of the lubricant.

In a case where the mixture ratio of the buffer particles is less than 20 parts by weight, the effect of reducing the noise produced by the speed reduction gear by absorbing shock with the buffer particles interposed in the engaged portion of the gears to reduce the teeth striking sound may be insufficient. In a case where the mixture ratio of the buffer particles exceeds 300 parts by weight, the steering torque produced by the electric power steering apparatus may be raised, and the sliding sound may be produced, and the noise produced by the speed reduction gear is rather increased.

It is preferable that the mixture ratio of the buffer particles to 100 parts by weight of the lubricant is particularly not less than 25 parts by weight even in the above-mentioned range, considering that the effect of reducing the teeth striking sound is further improved. It is preferable that the mixture ratio of the buffer particles is particularly not more than 100 parts by weight in the above-mentioned range, considering that the rise in the steering torque and the production of the sliding sound are more reliably prevented.

As the lubricant for dispersing the buffer particles, either liquid lubricating oil or semisolid grease may be used.

Preferably used as the lubricating oil is one whose kinetic viscosity is 5 to 200 mm$^2$/s (40° C.) and is particularly 20 to 100 mm$^2$/s (40° C.).

Although synthetic hydrocarbon oil (e.g., poly (α-olefin) oil) is preferable as the lubricating oil, synthetic oil such as silicone oil, fluorine oil, ester oil, and ether oil, and mineral oil can be also used. The lubricating oils can be used alone or may be used in combination.

A solid lubricant (molybdenum disulfide, graphite, PTFE (poly(tetrafluoroethylene)), etc.), a phosphorous- or sulfur-based extreme-pressure additive, an antioxidant such as tributylphenol or methylphenol, a rust preventive, a metal deactivator, a viscosity index improver, an oiliness improver, etc. may be added, as required, to the lubricating oil.

On the other hand, preferably used as the grease is one whose consistency is No. 2 to No. 000 and is particularly No. 2 to No. 00 in terms of the NLGI number as the lubricant composition to which the buffer particles are added.

The grease is formed by adding a thickening agent to lubricating base oil, as in the conventional example.

Although synthetic hydrocarbon oil (e.g., poly($\alpha$-olefin) oil) is preferable as the lubricating base oil, synthetic oil such as silicone oil, fluorine oil, ester oil, and ether oil, and mineral oil can be also used. It is preferable that the kinetic viscosity of the lubricating base oil is 5 to 200 mm$^2$/s (40° C.) and is particularly 20 to 100 mm$^2$/s (40° C.)

As the thickening agent, various types of thickening agents (soap- or non-soap-based thickening agents) conventionally known can be used.

Furthermore, a solid lubricant (molybdenum disulfide, graphite, PTFE, etc.), a phosphorous- or sulfur-based extreme-pressure additive, an antioxidant such as tributylphenol or methylphenol, a rust preventive, a metal deactivator, a viscosity index improver, an oiliness improver, etc. may be further added, as required, to the grease.

<Speed Reduction Gear and Electric Powder Steering Apparatus>

Figure 2:
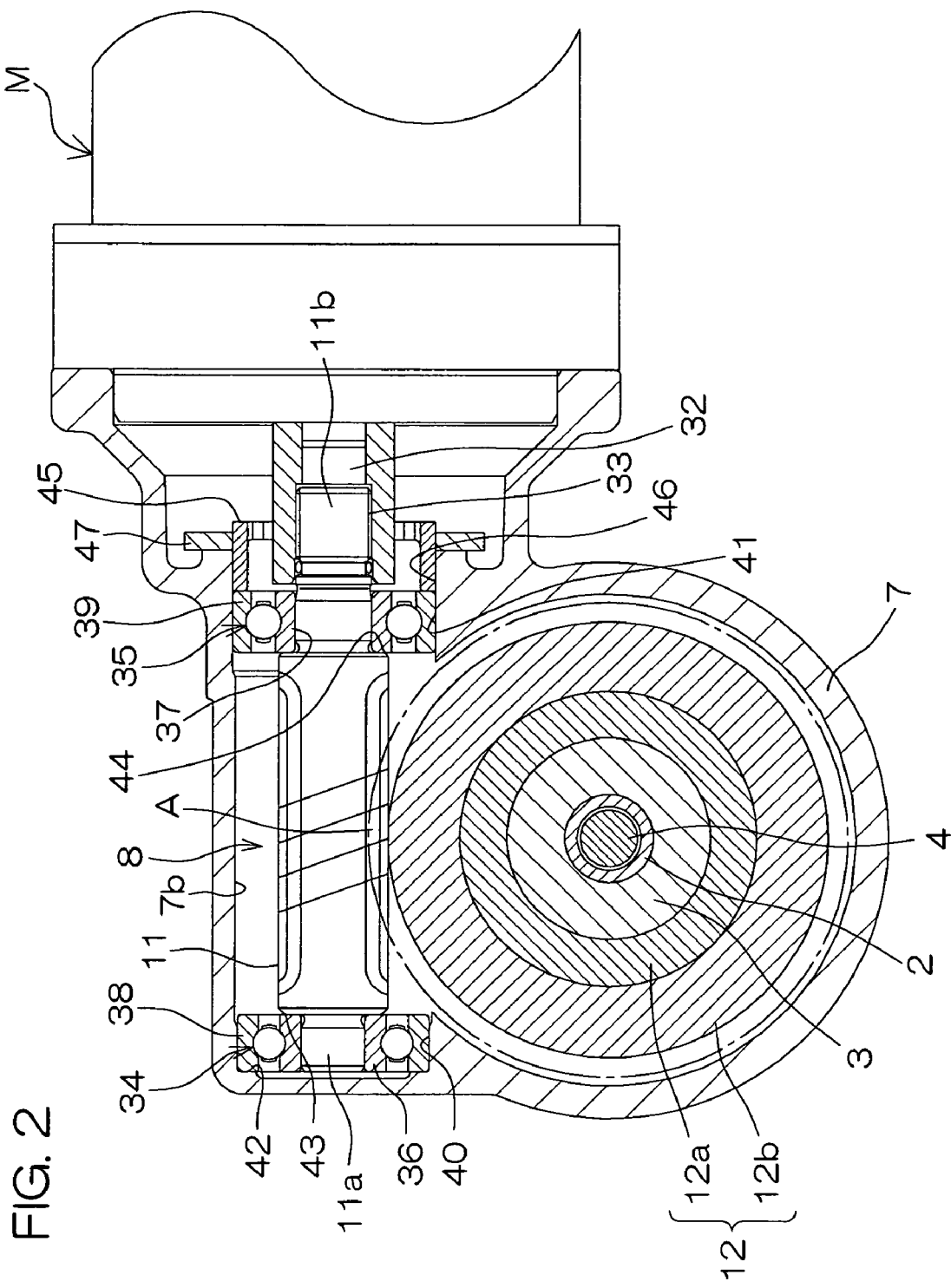
FIG. 2 is a cross-sectional view taken along a line II-II shown in FIG. 1.

FIG. 1 is a schematic sectional view of an electric power steering apparatus according to an embodiment of the present invention. FIG. 2 is a cross-sectional view taken along a line II-II shown in FIG. 1.

Referring to FIG. 1, in the electric power steering apparatus in this example, a first steering shaft 2 serving as an input shaft to which a steering wheel 1 is attached and a second steering shaft 3 serving as an output shaft connected to a steering mechanism (not shown) such as a rack-and-pinion mechanism are coaxially connected to each other through a torsion bar 4.

A housing 5 for supporting the first and second steering shafts 2 and 3 is composed of an aluminum alloy, for example, and is attached to an automobile body (not shown). The housing 5 comprises a sensor housing 6 and a gear housing 7 which are fitted to each other. Specifically, the gear housing 7 has a cylindrical shape, and an annular edge 7a at its upper end is fitted in an annular step 6a in the outer periphery at a lower end of the sensor housing 6. The gear housing 7 accommodates a worm gear mechanism 8 serving as a speed reduction mechanism, and the sensor housing 6 accommodates a torque sensor 9, a control board 10, and so on. A speed reduction gear 50 is configured by accommodating the worm gear mechanism 8 in the gear housing 7.

The worm gear mechanism 8 comprises a worm wheel 12 which is rotatable integrally with an intermediate portion in the axial direction of the second steering shaft 3 and whose movement in the axial direction is regulated, and a worm shaft 11 (see FIG. 2) which is engaged with the worm wheel 12 and is connected to a rotating shaft 32 in an electric motor M through a spline joint 33.

The worm wheel 12 comprises an annular core metal 12a coupled to the second steering shaft 3 so as to be integrally rotatable, and a synthetic resin member 12b surrounding the core metal 12a and having teeth formed on its outer peripheral surface. The core metal 12a is inserted into a metal mold at the time of resin molding of the synthetic resin member 12b, for example. The core metal 12a and the synthetic resin member 12b are coupled to and integrated with each other by resin molding in a state where the core metal 12a is inserted into the metal mold.

The second steering shaft 3 is supported so as to be rotatable by first and second rolling bearings 13 and 14 arranged with the worm wheel 12 interposed on the upper and lower sides in the axial direction therebetween.

An outer ring 15 in the first rolling bearing 13 is fitted in a bearing holding hole 16 provided inside a cylindrical projection 6b at a lower end of the sensor housing 6 and is held therein. An upper end surface of the outer ring 15 is abutted against an annular step 17 so that the upward movement in the axial direction of the outer ring 15 relative to the sensor housing 6 is regulated.

On the other hand, an inner ring 18 in the first rolling bearing 13 is fitted in the second steering shaft 3 by way of interference fit. A lower end surface of the inner ring 18 is abutted against an upper end surface of the core metal 12a in the worm wheel 12.

An outer ring 19 in the second rolling bearing 14 is fitted in a bearing holding hole 20 in the gear housing 7 and is held therein. A lower end surface of the outer ring 19 is abutted against an annular step 21 so that the downward movement in the axial direction of the outer ring 19 relative to the gear housing 7 is regulated.

On the other hand, an inner ring 22 in the second rolling bearing 14 is attached to the second steering shaft 3 so as to be integrally rotatable and with the relative movement in the axial direction regulated. The inner ring 22 is interposed between a step 23 in the second steering shaft 3 and a nut 24 tightened into a screw of the second steering shaft 3.

The torsion bar 4 penetrates the first and second steering shafts 2 and 3. An upper end 4a of the torsion bar 4 is connected to the first steering shaft 2 so as to be integrally rotatable by a connecting pin 25, and a lower end 4b of the torsion bar 4 is connected to the second steering shaft 3 so as to be integrally rotatable by a connecting pin 26. A lower end of the second steering shaft 3 is connected to a steering mechanism such as a rack-and-pinion mechanism, as described above, through an intermediate shaft (not shown).

The connecting pin 25 connects the first steering shaft 2 and a third steering shaft 27 arranged coaxially with the first steering shaft 2 so as to be integrally rotatable. The third steering shaft 27 penetrates a tube 28 composing a steering column.

An upper part of the first steering shaft 2 is supported on the sensor housing 6 through a third rolling bearing 29 composed of a needle rolling bearing, for example, so as to be rotatable. A reduced diameter portion 30 in a lower part of the first steering shaft 2 and a hole 31 in an upper part of the second steering shaft 3 are fitted to each other with predetermined play provided therebetween in the direction of rotation so that the relative rotation between the first and second steering shafts 2 and 3 is regulated in a predetermined range.

Referring to FIG. 2, the worm shaft 11 is supported so as to be rotatable by fourth and fifth rolling bearings 34 and 35 held by the gear housing 7.

Inner rings 36 and 37 in the fourth and fifth rolling bearings 34 and 35 are fitted in corresponding constricted portions of the worm shaft 11. Further, outer rings 38 and 39 are respectively held in bearing holding holes 40 and 41 in the gear housing 7.

The gear housing 7 includes a portion 7b opposed to a part of a peripheral surface of the worm shaft 11 in the radial direction.

The outer ring 38 in the fourth rolling bearing 34 for supporting one end 11a of the worm shaft 11 is abutted against a step 42 in the gear housing 7 and is positioned therein. On the other hand, the inner ring 36 is abutted against a positioning step 43 in the worm shaft 11, thereby regulating the movement thereof toward the other end 11b.

The inner ring 37 in the fifth rolling bearing 35 for supporting the vicinity of the other end 11b of the worm shaft 11 (an end on the side of a joint) is abutted against a positioning step 44 in the worm shaft 11, thereby regulating the movement thereof toward the one end 11a. Further, the outer ring 39 is urged toward the fourth rolling bearing 34 by a screw member 45 for pre-load adjustment. The screw member 45 is screwed into a screw hole 46 formed in the gear housing 7, thereby applying a pre-load to the pair of rolling bearings 34 and 35 as well as positioning the worm shaft 11 in the axial direction. Reference numeral 47 denotes a lock nut which is engaged with the screw member 45 in order to fasten the screw member 45 after pre-load adjustment.

In the gear housing 7, an area including at least an engaged portion A of the worm shaft 11 and the worm wheel 12 is filled with the lubricant composition having the buffer particles dispersed therein, previously described. That is, with the lubricant composition, only the engaged portion A may be filled, the engaged portion A and the whole of a peripheral edge of the worm shaft 11 may be filled, or the whole of the gear housing 7 may be filled.

The present invention is not limited to the above-mentioned embodiment. Various modifications can be made within the range of items described in the claims of the present invention. For example, the configuration of the speed reduction gear according to the present invention is applicable to speed reduction gears for apparatuses other than the electric power steering apparatus.

EXAMPLES

The present invention will be described in more detail on the basis of examples.

(Production of Buffer Particles)

Example 1-1

Used as aliphatic polyester polyol A was ester of butylene glycol and adipic acid (a number-average molecular weight Mn=2000, a hydroxyl value 56). Used as aromatic polyester polyol B was ester of hexamethylene glycol and phthalic acid (a number-average molecular weight Mn=1000, a hydroxyl value 112).

226 g of the aliphatic polyester polyol, 226 g of the aromatic polyester polyol, 490 g of isooctane serving as a dispersion medium, and 19 g of a dispersion stabilizer [N-5741 manufactured by NIPPON POLYURETHANE INDUSTRY CO., LTD.] were fed into a 1 liter flask while supplying nitrogen to the flask. The weight ratio of the aliphatic polyester polyol A to the aromatic polyester polyol B was set to A/B=50/50.

Agitation was then started. 0.003 g of di-n-butyltin dilaurate serving as a catalyst was added with the aliphatic polyester polyol and the aromatic polyester polyol dispersed in isooctane, and 116 g of hexamethylene diisocyanate serving as polyisocyanate was further added, followed by reaction at 80 to 90° C. for three hours.

At the time point where the concentration of an isocyanate end group reached 5.4% upon sequentially analyzing a reaction liquid, 32 g of trimethylolpropane serving as a crosslinking agent (corresponding to a rate of 1 mole per 1 mole of the total amount of the aliphatic polyester polyol and the aromatic polyester polyol serving as long-chain polyol) was added, followed by reaction at 80 to 90° C. for three more hours, and a solid content was then filtered and dried, to produce 600 g of polyurethane resin particles serving as buffer particles.

The average particle diameter of the polyurethane resin particles was 150 μm, and the particle size distribution thereof was 40 to 300 μm. With respect to the physical properties of a polyurethane resin sheet produced on the same components excluding a dispersion stabilizer, shore A hardness $H_A$ was 60, elongation at break was 360%, and tensile strength Tb was 30 MPa.

Example 1-2~1-13

600 g of polyurethane resin particles serving as buffer particles having an average particle diameter of 150 μm and having a particle size distribution of 40 to 300 μm were produced in the same manner as that in the example 1-1 except that the respective mixture amounts of aliphatic polyester polyol A, aromatic polyester polyol B, and trimethylolpropane were adjusted so that the mixture amount of the trimethylolpropane per 1 mole of the total amount of the aliphatic polyester polyol A and the aromatic polyester polyol B was 0.1 to 5 moles, as shown in Table 1, described later, and the concentration of an isocyanate end group was adjusted, while maintaining 50/50 as the weight ratio A/B of the aliphatic polyester polyol A to the aromatic polyester polyol B.

(Production and Evaluation of Lubricant Composition)

The polyurethane resin particles produced in the above-mentioned examples 1-1~1-13 were mixed at a mixture ratio of 40 parts by weight to 100 parts by weight of grease obtained by adding a soap-based thickening agent to poly(α-olefin) oil, to prepare grease serving as a lubricant composition.

Figure 3:
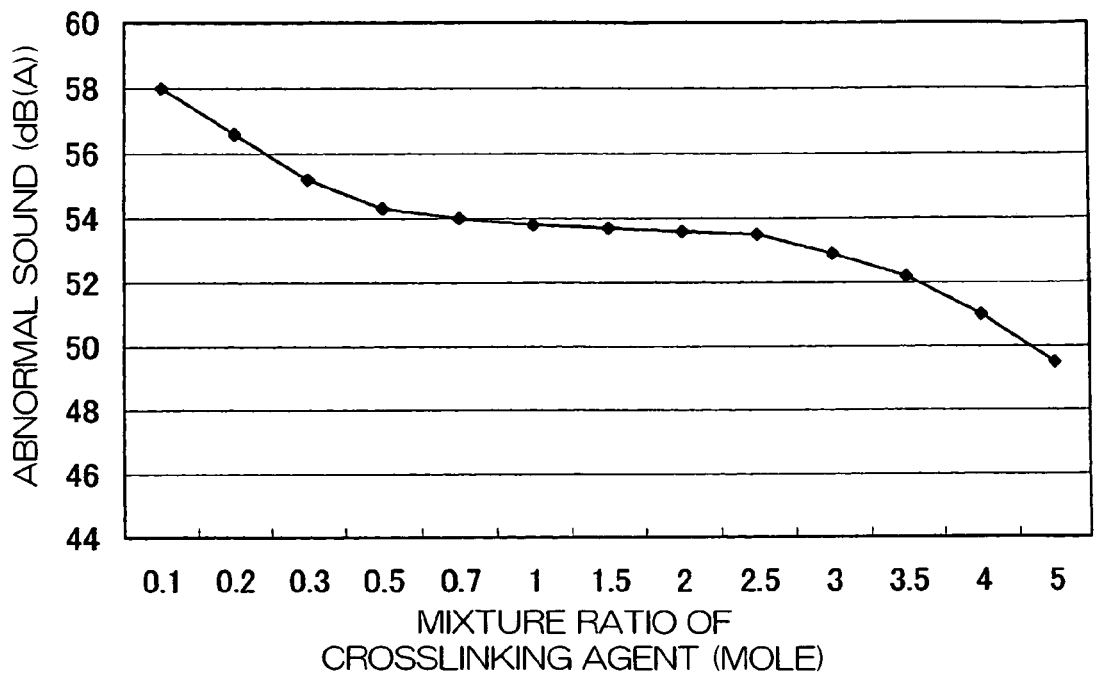
FIG. 3 is a graph showing results obtained in measuring the relationship between the ratio of a crosslinking agent to long-chain polyol and an abnormal sound produced by a speed reduction gear in an electric power steering apparatus in an examples of the present invention.
Figure 4:
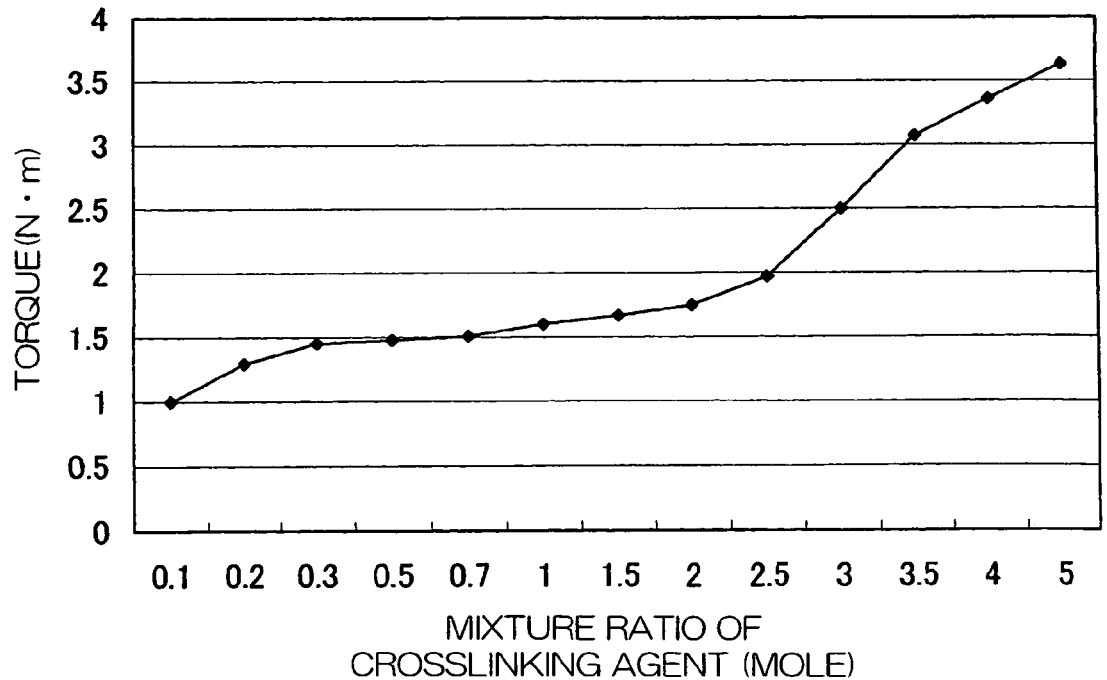
FIG. 4 is a graph showing results obtained in measuring the relationship between the ratio of a crosslinking agent to long-chain polyol and steering torque produced by an electric power steering apparatus in an examples of the present invention.

The speed reduction gear in the electric power steering apparatus shown in FIGS. 1 and 2 was filled with each of the greases, to measure an abnormal sound (dB(A)) which is a combination of a teeth striking sound and a sliding sound and steering torque (N·m) In a worm gear mechanism, a worm made of an iron-based metal and a worm wheel made of polyamide resin were combined with each other. Backlash was set to 2'. The results of the measurement of the abnormal sound are shown in Table 1 and FIG. 3, and the results of the measurement of the steering torque are shown in Table 1 and FIG. 4.

TABLE 1

|  | Molar ratio of crosslinking agent | Abnormal sound (db(A)) | Steering torque (N · m) |
| --- | --- | --- | --- |
| Example 1-2 | 0.1 | 58 | 1 |
| Example 1-3 | 0.2 | 56.6 | 1.29 |
| Example 1-4 | 0.3 | 55.2 | 1.45 |
| Example 1-5 | 0.5 | 54.3 | 1.48 |
| Example 1-6 | 0.7 | 54 | 1.51 |
| Example 1-1 | 1 | 53.8 | 1.6 |
| Example 1-7 | 1.5 | 53.7 | 1.67 |
| Example 1-8 | 2 | 53.6 | 1.75 |
| Example 1-9 | 2.5 | 53.5 | 1.97 |
| Example 1-10 | 3 | 52.9 | 2.5 |
| Example 1-11 | 3.5 | 52.2 | 3.07 |
| Example 1-12 | 4.5 | 51 | 3.36 |
| Example 1-13 | 5 | 49.5 | 3.63 |

As can be seen from Table 1 and the figures, the higher the ratio of the trimethylolpropane serving as a crosslinking agent per 1 mole of long-chain polyol is, the denser the three-dimensional mesh-shaped structure of polyurethane resin is made so that the harder the polyurethane resin particles can be. Therefore, noise produced by the speed reduction gear can be reduced. However, the steering torque produced by the electric power steering apparatus tends to be raised. Conversely, the lower the ratio of trimethylolpropane serving as a crosslinking agent per 1 mole of long-chain polyol is, the sparser the three-dimensional mesh-shaped structure of the polyurethane resin is made so that the softer the polyurethane resin particles can be. Therefore, the rise in the steering torque produced by the electric power steering apparatus can be restrained. However, noise produced by the speed reduction gear tends to be raised.

(Production of Buffer Particles)

Example 2-1

Used as aliphatic polyester polyol A and aromatic polyester polyol B were respectively the same ones as those used in the example 1-1.

346.8 g of the aliphatic polyester polyol, 61.2 g of the aromatic polyester polyol, 490 g of isooctane serving as a dispersion medium, and 37 g of a dispersion stabilizer [N-5741 manufactured by NIPPON POLYURETHANE INDUSTRY CO., LTD.] were fed into a 1 liter flask while supplying nitrogen to the flask. The weight ratio of the aliphatic polyester polyol A to the aromatic polyester polyol B was set to A/B=85/15.

Agitation was then started. 0.003 g of di-n-butyltin dilaurate serving as a catalyst was added with the aliphatic polyester polyol and the aromatic polyester polyol dispersed in isooctane, and 138 g of hexamethylene diisocyanate serving as polyisocyanate was further added, followed by reaction at 80 to 90° C. for three hours.

At the time point where the concentration of an isocyanate end group reached 4.6% upon sequentially analyzing a reaction liquid, 53 g of trimethylolpropane serving as a crosslinking agent (corresponding to a rate of 2.5 moles per 1 mole of the total amount of the aliphatic polyester polyol and the aromatic polyester polyol serving as long-chain polyol) was added, followed by reaction at 80 to 90° C. for three more hours, and a solid content was then filtered and dried, to produce 600 g of polyurethane resin particles serving as buffer particles.

The average particle diameter of the polyurethane resin particles was 150 μm, and the particle size distribution was 40 to 300 μm. With respect to the physical properties of a polyurethane resin sheet produced on the same precipitation excluding a dispersion stabilizer, shore A hardness $H_A$ was 70, elongation at break was 310%, and tensile strength Tb was 27 MPa.

Example 2-2~2-11

600 g of polyurethane resin particles serving as buffer particles having an average particle diameter of 150 μm and having a particle size distribution of 40 to 300 μm were produced in the same manner as that in the example 2-1 except that the respective mixture amounts of aliphatic polyester polyol A, aromatic polyester polyol B, and trimethylolpropane were adjusted so that the mixture ratio of the aliphatic polyester polyol A to the aromatic polyester polyol B was A/B=5/95~95/5, as shown in Table 2, described later, and the concentration of an isocyanate end group was adjusted, while maintaining 2.5 moles as the mixture amount of the trimethylolpropane per 1 mole of the total amount of the aliphatic polyester polyol A and the aromatic polyester polyol B.

(Production and Evaluation of Lubricant Composition)

The polyurethane resin particles produced in the above-mentioned examples 2-1~2-11 were mixed at a mixture ratio of 40 parts by weight to 100 parts by weight of grease obtained by adding a soap-based thickening agent to poly(α-olefin) oil, to prepare grease serving as a lubricant composition.

Figure 5:
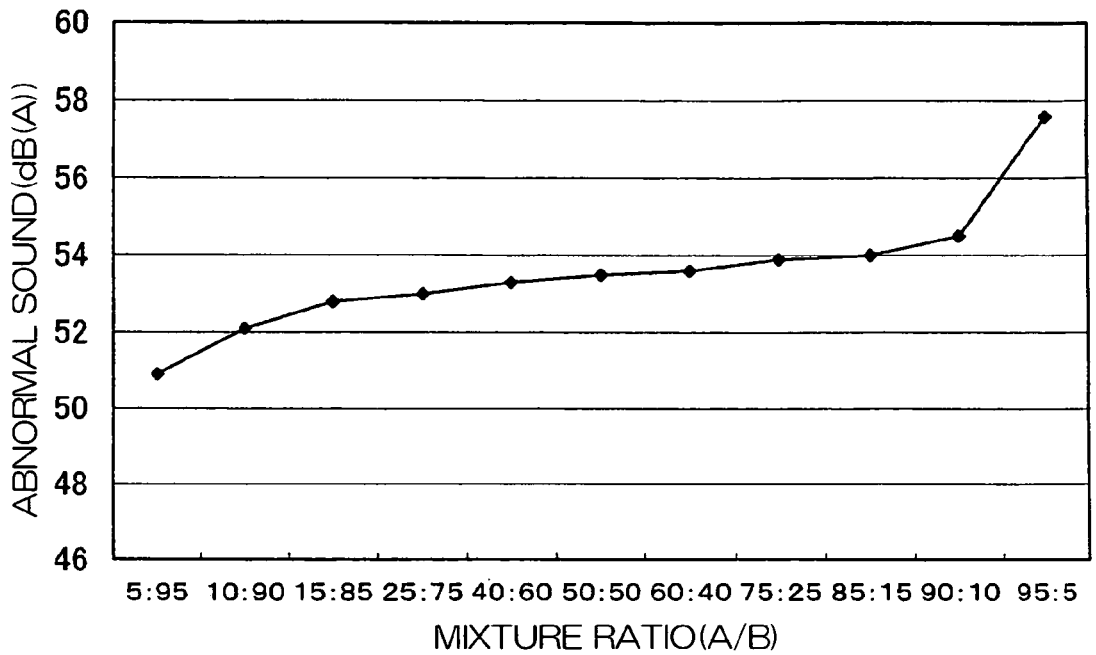
FIG. 5 is a graph showing results obtained in measuring the relationship between the mixture ratio of aliphatic polyester polyol to aromatic polyester polyol serving as long-chain polyol and an abnormal sound produced by a speed reduction gear in an electric power steering apparatus in an examples of the present invention.
Figure 6:
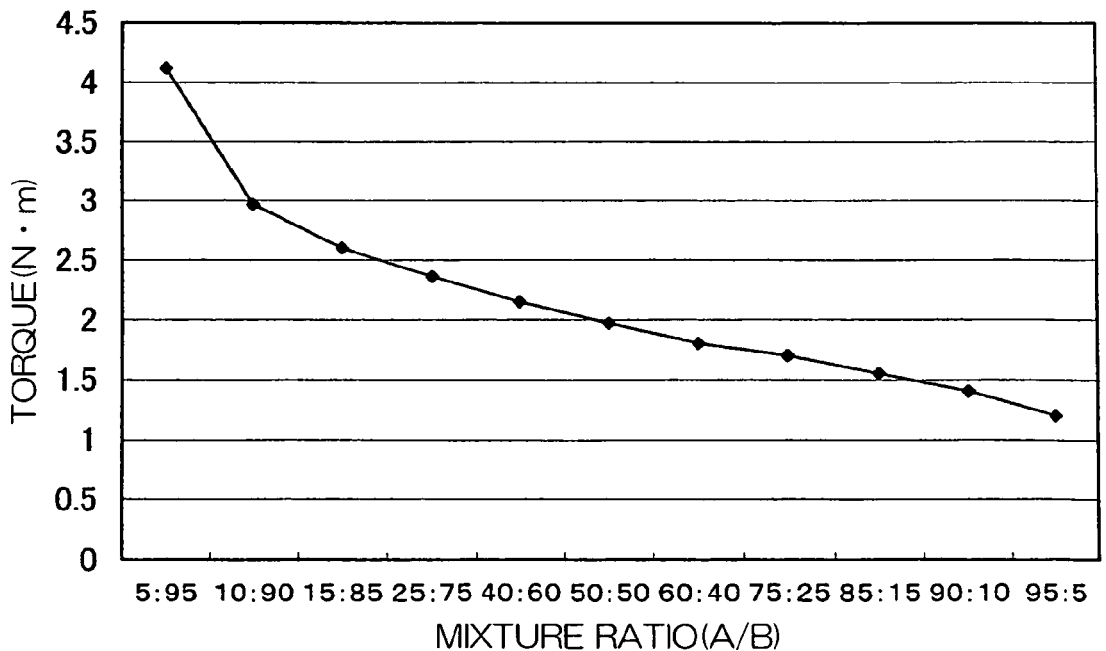
FIG. 6 is a graph showing results obtained in measuring the relationship between the mixture ratio of aliphatic polyester polyol to aromatic polyester polyol serving as long-chain polyol and steering torque produced by an electric power steering apparatus in an examples of the present invention.

The speed reduction gear in the electric power steering apparatus shown in FIGS. 1 and 2 was filled with each of the greases, to measure an abnormal sound (dB(A)) which is a combination of a teeth striking sound and a sliding sound and steering torque (N·m). In a worm gear mechanism, a worm made of an iron-based metal and a worm wheel made of polyamide resin were combined with each other. Backlash was set to 2'. The results of the measurement of the abnormal sound are shown in Table 2 and FIG. 5, and the results of the measurement of the steering torque are shown in Table 2 and FIG. 6.

TABLE 2

| | A/B | Abnormal sound (db(A)) | Steering torque (N · m) |
|---|---|---|---|
| Example 2-2 | 5/95 | 50.9 | 4.12 |
| Example 2-3 | 10/90 | 52.1 | 2.97 |
| Example 2-4 | 15/85 | 52.8 | 2.6 |
| Example 2-5 | 25/75 | 53 | 2.36 |
| Example 2-6 | 40/60 | 53.3 | 2.15 |
| Example 2-7 | 50/50 | 53.5 | 1.97 |
| Example 2-8 | 60/40 | 53.6 | 1.8 |
| Example 2-9 | 75/25 | 53.9 | 1.7 |
| Example 2-1 | 85/15 | 54 | 1.55 |
| Example 2-10 | 90/10 | 54.5 | 1.4 |
| Example 2-11 | 95/5 | 57.6 | 1.2 |

As can be seen from Table 2 and the figures, the higher the ratio of the aliphatic polyester polyol A serving as the long-chain polyol is, the softer the polyurethane resin particles can be. Therefore, the rise in the steering torque produced by the electric power steering apparatus can be restrained. However, the noise produced by the speed reduction gear tends to be raised. Conversely, the higher the ratio of the aliphatic polyester polyol B is, the harder the polyurethane resin particles can be. Therefore, the noise produced by the speed reduction gear can be reduced. However, the steering torque produced by the electric power steering apparatus tends to be raised.

(Production of Buffer Particles)

Example 3

Used as aliphatic polyester polyol A and aromatic polyester polyol B were respectively the same ones as those used in the example 1-1.

365.5 g of the aliphatic polyester polyol, 64.5 g of the aromatic polyester polyol, 490 g of isooctane serving as a dispersion medium, and 18 g of a dispersion stabilizer [N-5741 manufactured by NIPPON POLYURETHANE INDUSTRY CO., LTD.] were fed into a 1 liter flask while supplying nitrogen to the flask. The weight ratio of the aliphatic polyester polyol A to the aromatic polyester polyol B was set to A/B=85/15.

Agitation was then started. 0.003 g of di-n-butyltin dilaurate serving as a catalyst was added with the aliphatic polyester polyol and the aromatic polyester polyol dispersed in isooctane, and 125 g of hexamethylene diisocyanate serving as polyisocyanate was further added, followed by reaction at 80 to 90° C. for three hours.

At the time point where the concentration of an isocyanate end group reached 3.9% upon sequentially analyzing a reaction liquid, 45 g of trimethylolpropane serving as a crosslinking agent (corresponding to a rate of 2.0 moles per 1 mole of the total amount of the aliphatic polyester polyol and the aromatic polyester polyol serving as long-chain polyol) was added, followed by reaction at 80 to 90° C. for three more hours, and a solid content was then filtered and dried, to produce 600 g of polyurethane resin particles serving as buffer particles.

The average particle diameter of the polyurethane resin particles was 150 μm, and the particle size distribution was 40 to 300 μm. With respect to the physical properties of a polyurethane resin sheet produced on the same precipitation excluding a dispersion stabilizer, shore A hardness $H_A$ was 68, elongation at break was 360%, and tensile strength Tb was 24 MPa.

(Production and Evaluation of Lubricant Composition)

The polyurethane resin particles produced in the above-mentioned example 3 were mixed at a mixture ratio of 40 parts by weight to 100 parts by weight of grease obtained by adding a soap-based thickening agent to poly(α-olefin) oil, to prepare grease serving as a lubricant composition.

The speed reduction gear in the electric power steering apparatus shown in FIGS. 1 and 2 was filled with the grease, to measure an abnormal sound (dB(A)) which is a combination of a teeth striking sound and a sliding sound and steering torque (N·m). In a worm gear mechanism, a worm made of an iron-based metal and a worm wheel made of polyamide resin were combined with each other. Backlash was set to 2'. The results of the measurement of the abnormal sound were 53.5 dB, and the results of the measurement of the steering torque were 1.6 N·m.

Example 4

Used as aliphatic polyester polyol A and aromatic polyester polyol B were respectively the same ones as those used in the example 1-1.

346.5 g of the aliphatic polyester polyol, 115.5 g of the aromatic polyester polyol, 490 g of isooctane serving as a dispersion medium, and 31 g of a dispersion stabilizer [N-5741 manufactured by NIPPON POLYURETHANE INDUSTRY CO., LTD.] were fed into a 1 liter flask while supplying nitrogen to the flask. The weight ratio of the aliphatic polyester polyol A to the aromatic polyester polyol B was set to A/B=75/25.

Agitation was then started. 0.003 g of di-n-butyltin dilaurate serving as a catalyst was added with the aliphatic polyester polyol and the aromatic polyester polyol dispersed in isooctane, and 107 g of hexamethylene diisocyanate serving as polyisocyanate was further added, followed by reaction at 80 to 90° C. for three hours.

At the time point where the concentration of an isocyanate end group reached 2.6% upon sequentially analyzing a reaction liquid, 31 g of trimethylolpropane serving as a crosslinking agent (corresponding to a rate of 1.2 moles per 1 mole of the total amount of the aliphatic polyester polyol and the aromatic polyester polyol serving as long-chain polyol) was added, followed by reaction at 80 to 90° C. for three more hours, and a solid content was then filtered and dried, to produce 600 g of polyurethane resin particles serving as buffer particles.

The average particle diameter of the polyurethane resin particles was 150 μm, and the particle size distribution was 40 to 300 μm. With respect to the physical properties of a polyurethane resin sheet produced on the same precipitation excluding a dispersion stabilizer, shore A hardness $H_A$ was 64, elongation at break was 280%, and tensile strength Tb was 24 MPa.

(Production and Evaluation of Lubricant Composition)

The polyurethane resin particles produced in the above-mentioned example 4 were mixed at a mixture ratio of 40 parts by weight to 100 parts by weight of grease obtained by adding a soap-based thickening agent to poly(α-olefin) oil, to prepare grease serving as a lubricant composition.

The speed reduction gear in the electric power steering apparatus shown in FIGS. 1 and 2 was filled with the grease, to measure an abnormal sound (dB(A)) which is a combination of a teeth striking sound and a sliding sound and steering torque (N·m). In a worm gear mechanism, a worm made of an iron-based metal and a worm wheel made of polyamide resin were combined with each other. Backlash was set to 2'. The results of the measurement of the abnormal sound were 54 dB (A), and the results of the measurement of the steering torque were 1.5 N·m.

Comparative Example 1

Used as aliphatic polyester polyol A and aromatic polyester polyol B were respectively the same ones as those used in the example 1-1.

250 g of the aliphatic polyester polyol, 250 g of the aromatic polyester polyol, 400 g of isooctane serving as a dispersion medium, and 46 g of a dispersion stabilizer [N-5741 manufactured by NIPPON POLYURETHANE INDUSTRY CO., LTD.] were fed into a 1 liter flask while supplying nitrogen to the flask. The weight ratio of the aliphatic polyester polyol A to the aromatic polyester polyol B was set to A/B=50/50.

Agitation was then started. 0.003 g of di-n-butyltin dilaurate serving as a catalyst was added with the aliphatic polyester polyol and the aromatic polyester polyol dispersed in isooctane, and 97 g of hexamethylene diisocyanate was further added, followed by reaction at 80 to 90° C. for three hours.

At the time point where the concentration of an isocyanate end group reached 1.5% upon sequentially analyzing a reaction liquid, 20 g of water serving as a chain extender (corresponding to a rate of 0.5 mole per 1 mole of the total amount of the aliphatic polyester polyol and the aromatic polyester polyol serving as long-chain polyol) was added, followed by reaction at 60 to 70° C. for three more hours, and a solid content was then filtered and dried, to produce 600 g of polyurethane resin particles serving as buffer particles.

The average particle diameter of the polyurethane resin particles was 150 μm, and the particle size distribution thereof was 40 to 300 μm. With respect to the physical properties of a polyurethane resin sheet produced on the same precipitation excluding a dispersion stabilizer, shore A hardness $H_A$ was 58, elongation at break was 500%, and tensile strength Tb was 11 MPa.

The polyurethane resin particles were thermoplastic, and the number-average molecular weight Mn measured by a gel permeation chromatography was 75000. Further, the glass transition temperature Tg was −42° C. The polyurethane resin particles did not have heat resistance and oil resistance. When grease was produced, therefore, a large number of particles were aggregated and integrated, and they could not be uniformly dispersed in the grease.

Although the present invention has been described and illustrated in detail, it is clearly understood that the same is by way of illustration and example only and is not to be taken by way of limitation, the spirit and scope of the present invention being limited only by the terms of the appended claims.

This application corresponds to Japanese Patent Application No. 2004-78995 filed with the Japanese Patent Office on Mar. 18, 2004, the disclosure of which is incorporated herein by reference.

What is claimed is:

1. A lubricant composition, comprising:
a grease; and
buffer particles comprised of a polyurethane resin,
wherein the polyurethane resin is obtained by a production method comprising the step of synthesizing the polyurethane resin to form the buffer particles by reacting:
(1) a long-chain polyol having a number-average molecular weight, Mn, of not less than 500 obtained by mixing (A) aliphatic polyester polyol A, obtained by reacting and synthesizing an aliphatic carboxylic acid and low-molecular-weight polyol, and (B) aromatic polyester polyol B, obtained by reacting and synthesizing an aromatic carboxylic acid and low-molecular-weight polyol, at a weight ratio of A/B ranging from 5/95 to 95/5;
(2) a cross-linking agent having three or more active hydrogen groups in one molecule and present in an amount ranging from 0.1 to 5 moles per mole of the long-chain polyol; and
(3) a polyisocyanate;
wherein the grease has a consistency, in a state where the buffer particles are added thereto, reported as an NLGI number which ranges from No. 2 to No. 000.

2. A lubricant composition, comprising:
a lubricating oil having a kinetic viscosity ranging from 5 to 200 $mm^2/s$ (40° C.); and
buffer particles comprised of a polyurethane resin,
wherein the polyurethane resin is obtained by a production method comprising the step of synthesizing the polyurethane resin to form the buffer particles by reacting:
(1') a long-chain polyol having a number-average molecular weight, Mn, of not less than 500 obtained by mixing (A) aliphatic polyester polyol A, obtained by reacting and synthesizing an aliphatic carboxylic acid and low-molecular-weight polyol, and (B) aromatic polyester polyol B, obtained by reacting and synthesizing an aromatic carboxylic acid and low-molecular-weight polyol, at a weight ratio of A/B ranging from 5/95 to 95/5:
(2) a cross-linking agent having three or more active hydrogen groups in one molecule and present in an amount ranging from 0.1 to 5 moles per mole of the long-chain polyol; and
(3) a polyisocyanate.

3. A speed reduction gear, comprising:
a small gear; and
a large gear,
wherein the small gear and the large gear engage and define an area including an engaged portion which is filled with a lubricant composition, the lubricant composition comprising:
a lubricant; and
buffer particles comprised of a polyurethane resin,
wherein the polyurethane resin is obtained by a production method comprising the step of synthesizing the polyurethane resin to form the buffer particles by reacting:
(1) a long-chain polyol having a number-average molecular weight, Mn, of not less than 500 obtained by mixing (A) aliphatic polyester polyol A, obtained by reacting and synthesizing an aliphatic carboxylic acid and low-molecular-weight polyol, and (B) aromatic polyester polyol B, obtained by reacting and synthesizing an aromatic carboxylic acid and low-molecular-weight polyol, at a weight ratio of A/B ranging from 5/95 to 95/5:
(2) a cross-linking agent having three or more active hydrogen groups in one molecule and present in an amount ranging from 0.1 to 5 moles per mole of the long-chain polyol; and
(3) a polyisocyanate.

4. An electric power steering apparatus, comprising:
a steering mechanism;
speed reduction gear of claim 3; and
an electric motor for steering assist having an output which is transmitted to the steering mechanism by reducing its speed through the speed reduction gear.

5. The lubricant composition recited in claim 1, the lubricant composition being for noise reduction of a speed reduction gear, wherein the buffer particles have an elasticity and a hardness effective to reduce noise between gears of the speed reduction gear.

6. A speed reduction gear, comprising:
a small gear; and
a large gear,
wherein the small gear and the large gear engage and define an area including an engaged portion which is filled with the lubricant composition of claim 1.

7. An electric power steering apparatus, comprising:
a steering mechanism;
the speed reduction gear of claim 6, and
an electric motor for steering assist having an output which is transmitted to the steering mechanism by reducing its speed through the speed reduction gear.

8. The lubricant composition recited in claim 2, the lubricant composition being for noise reduction of a speed reduction gear, wherein the buffer particles have an elasticity and a hardness effective to reduce noise between gears of the speed reduction gear.

9. A speed reduction gear, comprising:
a small gear; and
a large gear,
wherein the small gear and the large gear engage and define an area including an engaged portion which is filled with the lubricant composition of claim 2.

10. An electric power steering apparatus, comprising:
a steering mechanism;
the speed reduction gear of claim 9, and
an electric motor for steering assist having an output which is transmitted to the steering mechanism by reducing its speed through the speed reduction gear.

11. The speed reduction gear recited in claim 3, wherein the lubricant composition is for noise reduction of the speed reduction gear, and wherein the buffer particles have an elasticity and a hardness effective to reduce noise between the gears of the speed reduction gear.

* * * * *